United States Patent [19]

Kokado

[11] 3,962,540
[45] June 8, 1976

[54] DEVICE FOR EXTRACTING A PREDETERMINED SYNCHRONIZING SIGNAL FROM A COMPOSITE SYNCHRONIZING SIGNAL

[75] Inventor: Naoyuki Kokado, Tokyo, Japan
[73] Assignee: Tokyo Shibaura Electric Co., Ltd., Kawasaki, Japan
[22] Filed: June 12, 1974
[21] Appl. No.: 478,513

[30] Foreign Application Priority Data
June 25, 1973 Japan............................... 48-70741
June 25, 1973 Japan............................... 48-70742

[52] U.S. Cl. .................... 178/69.5 TV; 178/7.3 S; 328/139
[51] Int. Cl.² ......................................... H04L 7/00
[58] Field of Search ................. 178/69.5 TV, 7.3 S, 178/7.5 S; 328/139

[56] References Cited
UNITED STATES PATENTS 3,550,017  12/1970  Whalen............................... 328/139
3,575,215  4/1971   Boddy................................. 328/139
3,629,501  12/1971  Cense................................. 178/7.3 S
3,671,669  6/1972   Abbott................................ 178/7.3 S Primary Examiner—Malcolm A. Morrison
Assistant Examiner—Errol A. Krass
Attorney, Agent, or Firm—Oblon, Fisher, Spivak, McClelland & Maier

[57] ABSTRACT

A synchronizing signal extracting device comprises means for detecting each pulse included in a composite synchronizing signal; means for generating a first pulse in synchronism with the detected pulse or detected pulse having a predetermined width; and means including a gate circuit to which the first pulse is supplied, and operative to open the gate circuit after lapse of a predetermined time period from the rise of the detected pulse and extract, as a synchronizing pulse constituting a synchronizing signal to be extracted, the first pulse passed through the gate circuit.

12 Claims, 6 Drawing Figures

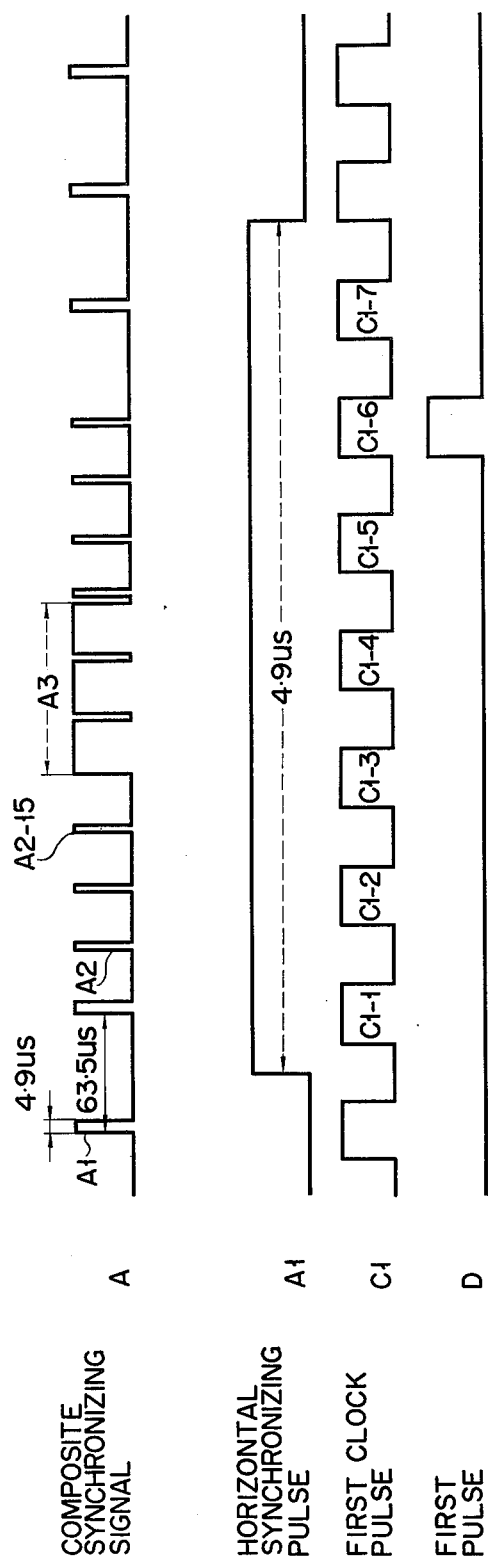

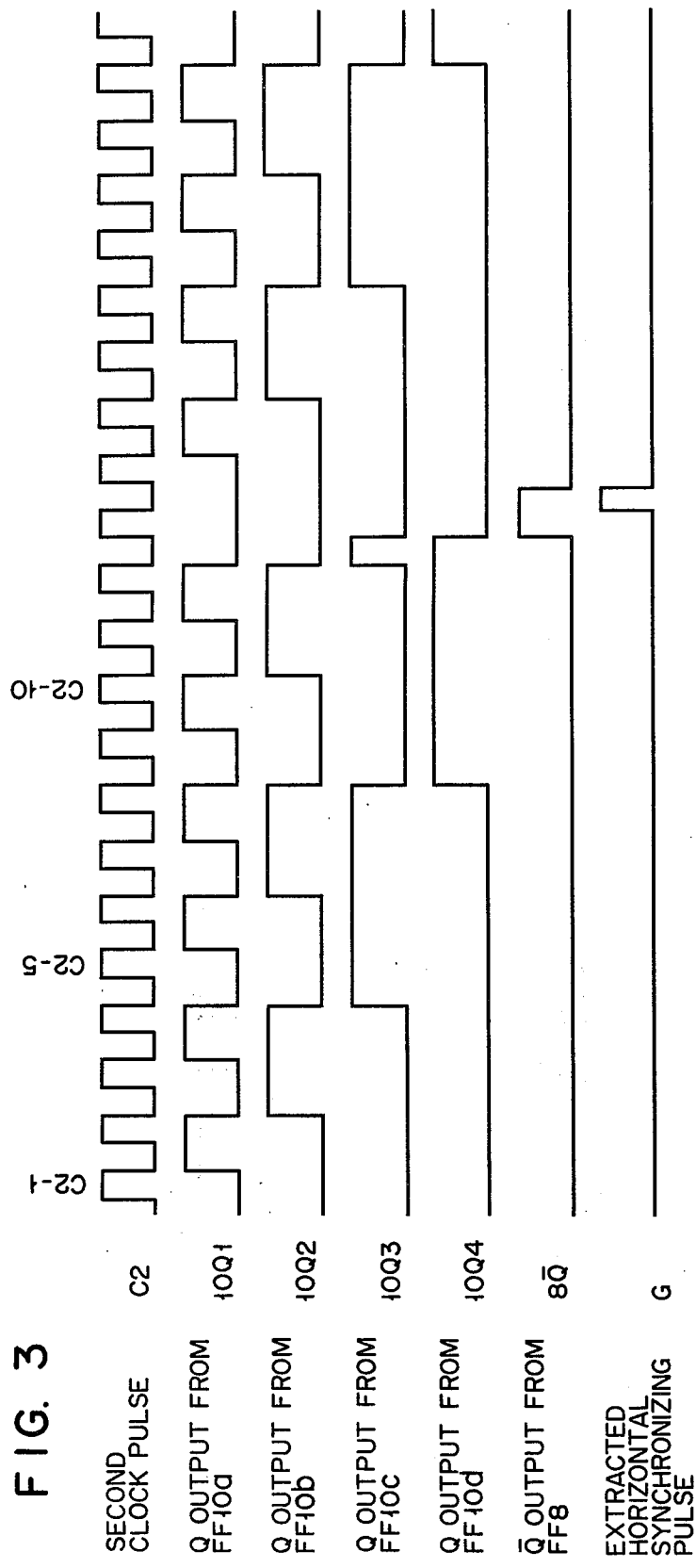

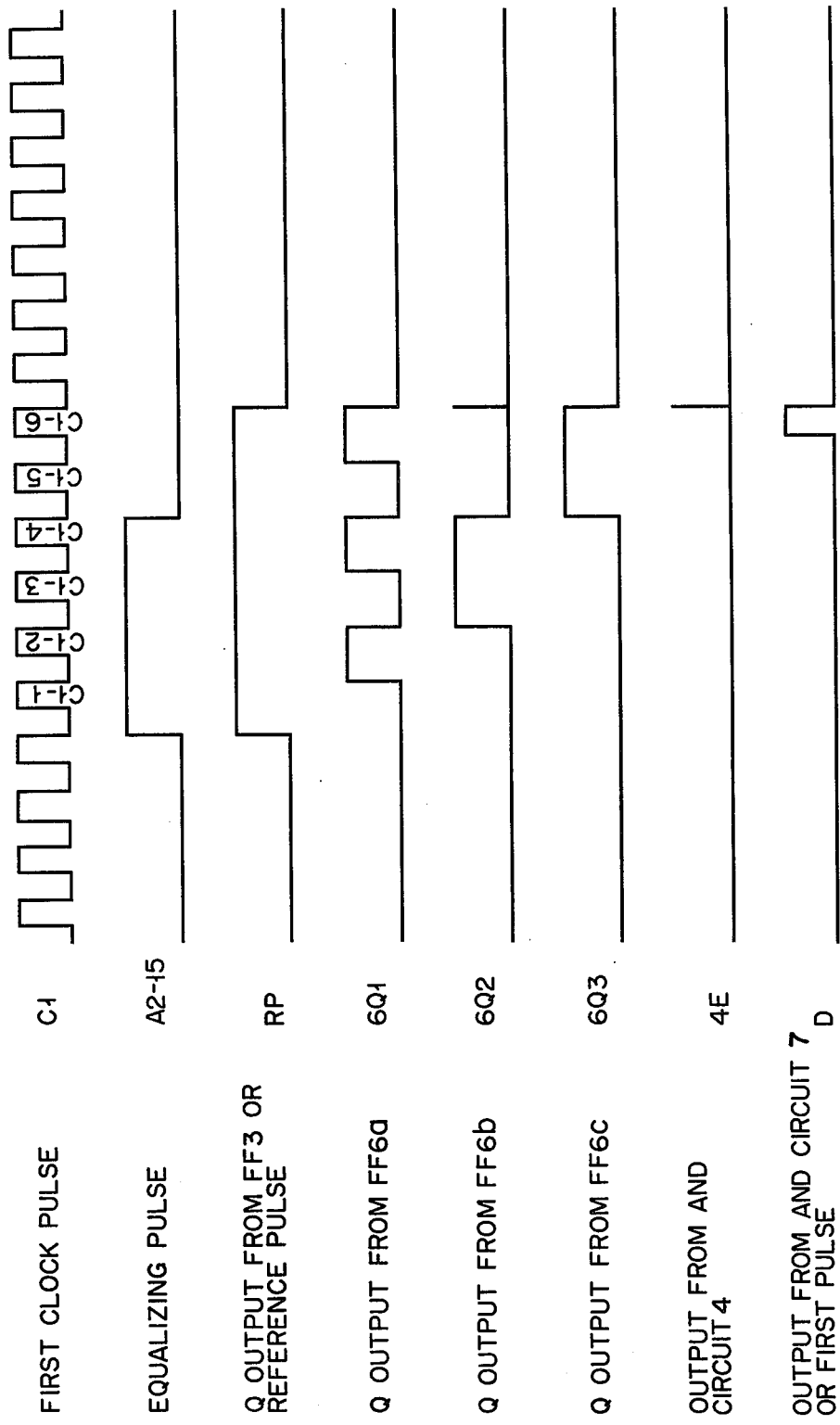

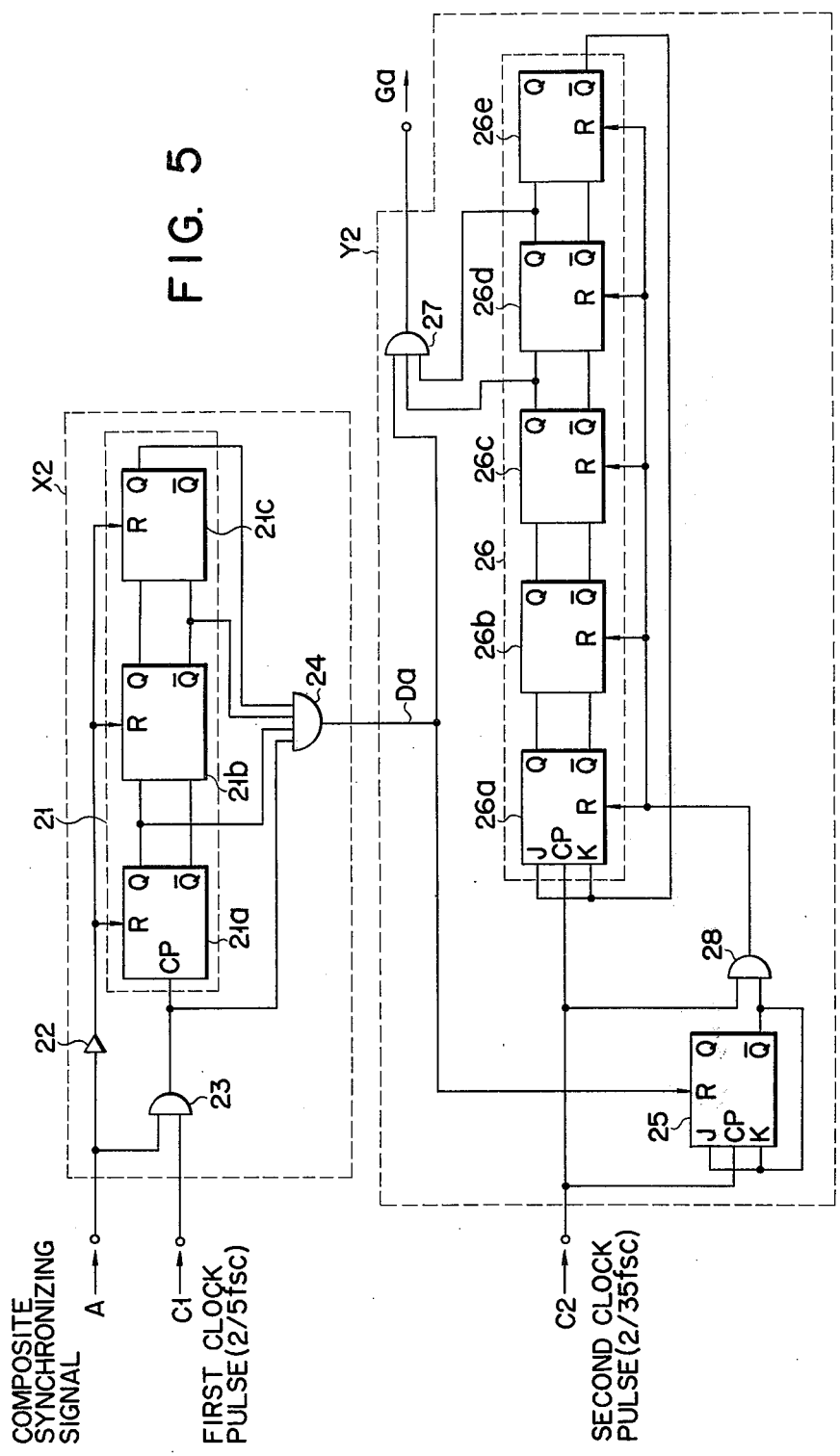

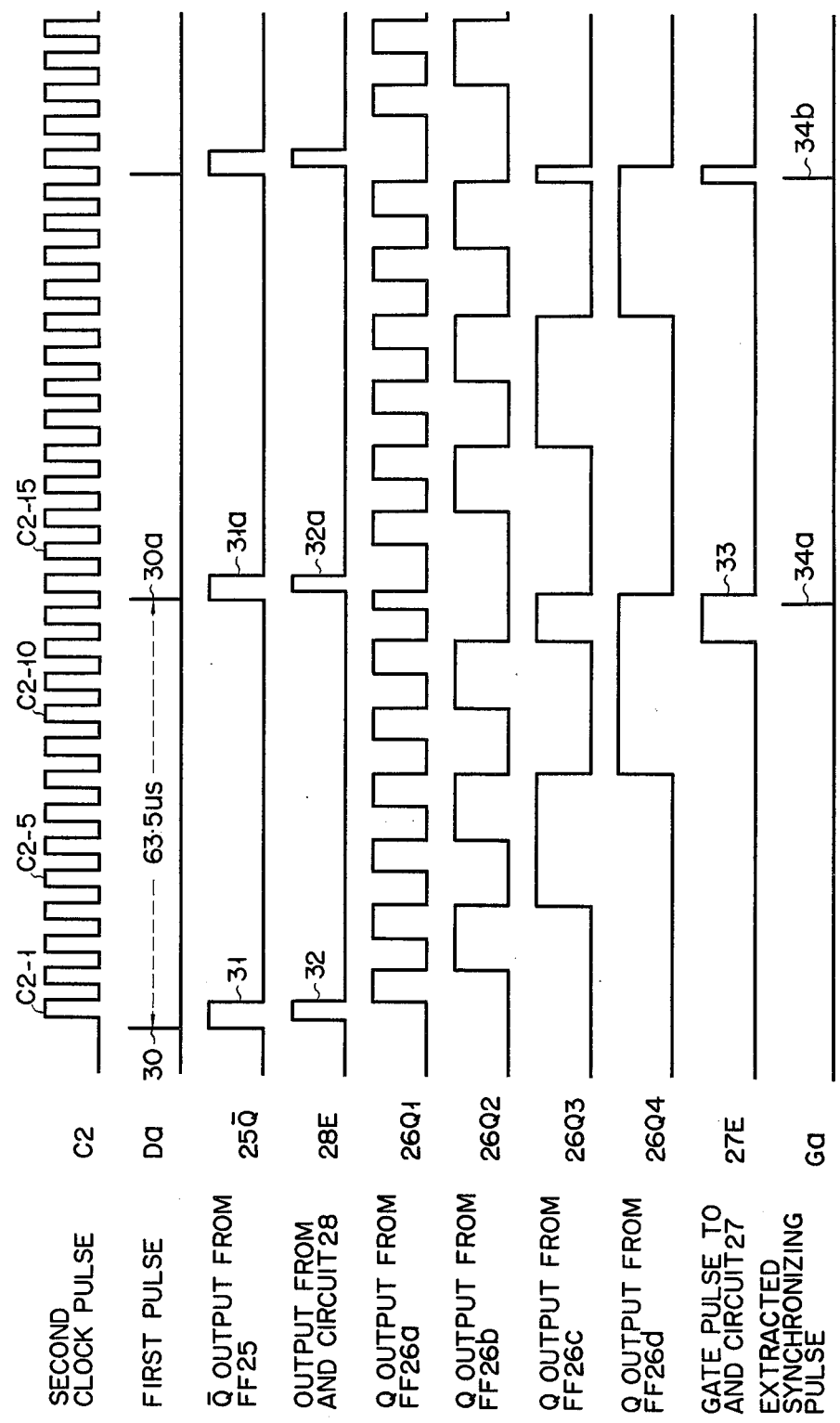

DEVICE FOR EXTRACTING A PREDETERMINED SYNCHRONIZING SIGNAL FROM A COMPOSITE SYNCHRONIZING SIGNAL

BACKGROUND OF THE INVENTION

This invention relates to a device for extracting from a composite synchronizing signal a synchronizing signal whose constituent synchronizing pulse has a desired cycle.

In a television receiver, a composite synchronizing signal obtained, through a synchronizing signal separation circuit, from a video signal includes a horizontal synchronizing pulse, vertical synchronizing pulse and equalizing pulse. Speaking of a horizontal scanning, a horizontal oscillation circuit is provided to obtain a horizontal scanning pulse and it is subject to an automatic frequency control (A.F.C) by both a horizontal synchronizing pulse and the output of a horizontal scanning pulse deflection device and a horizontal scanning is effected using the horizontal scanning pulse. In the case of such horizontal scanning it is unnecessary to separate a horizontal synchronizing signal from a composite synchronizing signal. However, there has been proposed a horizontal deflecting means adopting the method of obtaining a horizontal scanning pulse, without using such horizontal oscillation circuit, by frequency-dividing the output of an oscillator (for example, an oscillator for a color sub-carrier)-which is naturally incorporated into a TV receiver- having an oscillation frequency of an integral multiple of the frequency of a horizontal synchronizing pulse, and drawing the phase of the horizontal scanning pulse into the phase of the horizontal synchronizing pulse. Where such horizontal deflection means is adopted, it is necessary to extract, from a composite synchronizing signal separated from a video signal, a horizontal synchronizing signal whose constituent synchronizing pulse is a horizontal synchronizing pulse. However, the composite snychronizing signal sometimes includes a noise pulse in addition to the equalizing pulse and horizontal and vertical synchronizing pulses and, therefore, when the phase of the horizontal scanning pulse obtained by the above-mentioned frequency division is drawn into a pulse — a pulse regarded as a horizontal synchronizing pulse — extracted from a composite synchronizing signal using means for detecting a pulse width only, it is sometimes impossible to effect a satisfactory scanning.

In a PCM (Pulse Code Modulation) communication, a plurality of sets of synchronizing signals for address are included in a pulse code modulated wave and it is desired that a desired synchronizing signal consisting of synchronizing pulses having a predetermined cycle be extracted from the pulse code modulated wave.

It is accordingly the object of this invention to provide a device for extracting from a composite synchronizing signal, without being influenced by noises, a synchronizing signal whose constituent synchronizing pulses have a predetermined cycle.

SUMMARY OF THE INVENTION

A device according to this invention is adapted to extract, from a composite synchronizing signal including a plurality of synchronizing signals whose respective constituent synchronizing pulses are different in cycle and width from each other, a synchronizing signal whose constituent synchronizing pulse has a desired cycle; and comprises means for detecting each of pulses included in the composite synchronizing signal, means for generating a first pulse in synchronism with each of the detected pulses or According to one embodiment of this invention said first pulse generating means includes a circuit for generating, in response to each of pulses included in said composite synchronizing signal, a reference pulse of predetermined width which rises in synchronism with the rise of the pulse of the composite synchronizing signal. It is possible to generate said first pulse in synchronism with the reference pulse. There is further included means including a gate circuit to which said first pulse is supplied, and operative to open the gate circuit during a time period corresponding to a time width including a point of time delayed a predetermined period — a period determined by the cycle of the synchronizing pulses constituting a synchronizing signal to be extracted — after the rise of the reference pulse. During this time period the first pulse passed through the gate circuit is extracted as a desired synchronizing pulse.

According to another embodiment of this invention there is included means for detecting from said composite synchronizing signal a pulse having a width equal to or greater than a predetermined width and generating said first pulse each time the pulse is detected. There is further included means including a gate circuit to which the first pulse is supplied, and operative to open the gate circuit during a time period corresponding to a predetermined time width including a point of time delayed a predetermined time period — a period determined by the cycle of the synchronizing pulse constituting a synchronizing signal to be extracted — after the rise of the detected pulse. During said predetermined time period the first pulse passed through the gate circuit is extracted as a desired synchronizing pulse.

According to this invention, since a noise pulse included in the composite synchronizng signal seldom occurs in a cyclic fashion, there is little chance that the noise pulse will be extracted as a desired synchronizing pulse. If, therefore, this invention is applied to, for example, a horizontal scanning device of a TV receiver, then a horizontal scanning can be carried out without being influenced by noises.

This invention can be applied not only to a TV receiver, but also to the case where a desired synchronizing signal is extracted from a composite synchronizing signal including a plurality of synchronizing signals.

BRIEF DESCRIPTION OF THE DRAWINGS

FIG. 2 shows waveforms for explaining a relation of a first clock pulse, a horizontal synchronizing pulse included in a composite synchronizing pulse separated from a video signal, and a first pulse obtained by supplying the horizontal synchronizing pulse and first clock pulse to a circuit of FIG. 1;

FIG. 3 shows waveforms for explaining the manner in which a horizontal synchronizing pulse is extracted;

FIG. 4 shows waveforms for explaining the manner in which a first pulse is generated when an equalizing pulse is detected;

FIG. 5 is a circuit diagram showing another embodiment of this invention; and

FIG. 6 shows waveforms for explaining the manner in which a horizontal synchronizing signal included in a composite synchronizing signal is extracted.

DETAILED DESCRIPTION OF THE PREFERRED EMBODIMENT

Figure 1:
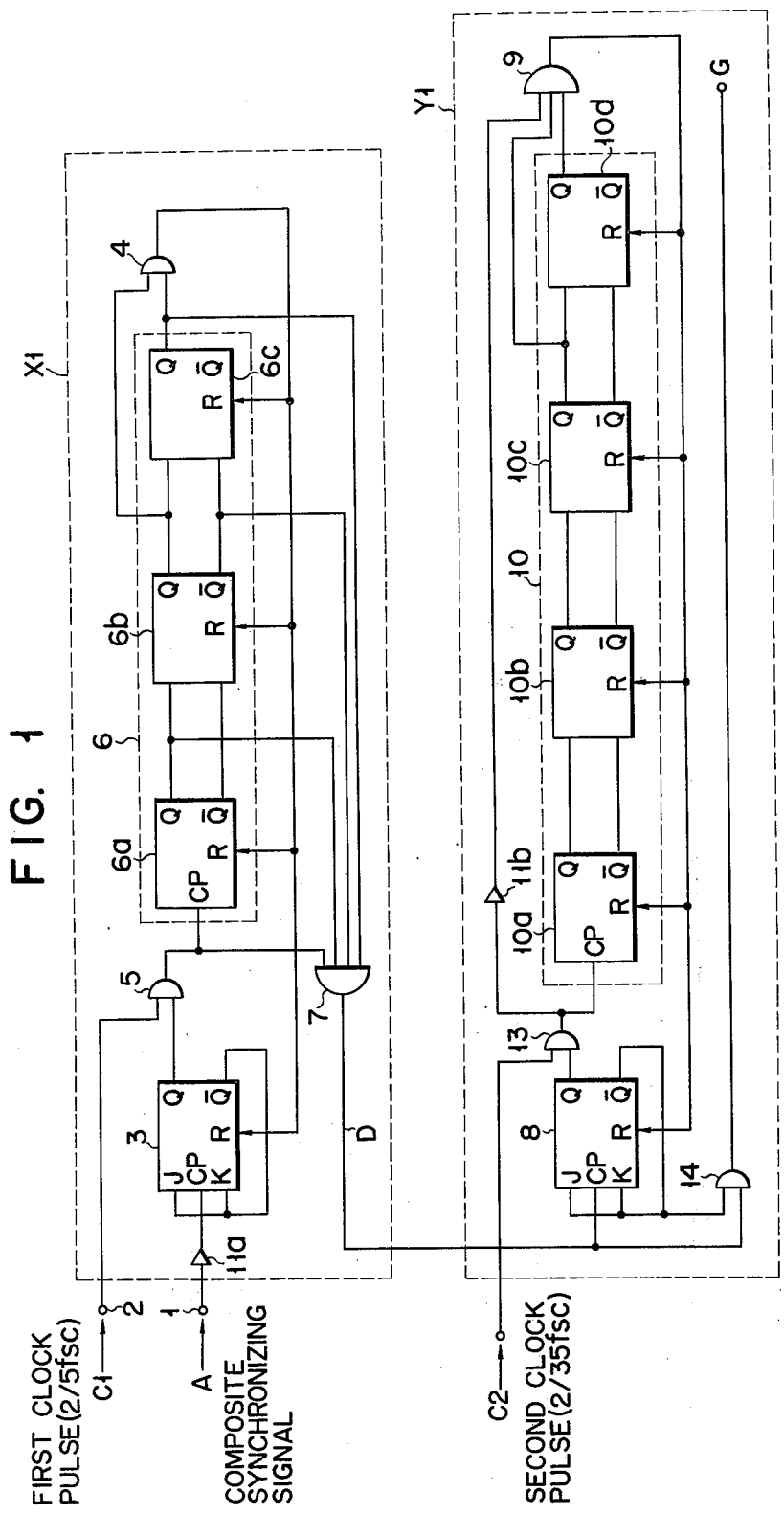
FIG. 1 is a circuit diagram showing one embodiment of this invention.

There will be explained the case where a horizontal synchronizing signal is extracted from a composite synchronizing signal separated from a video signal.

In FIG. 1, X1 shows a circuit for generating a first pulse, while Y1 shows a horizontal synchronizing signal extracting circuit. In the circuit X1, a composite synchronizing signal A (FIG. 2 A) separated from a video signal is supplied to a terminal 1 and a clock pulse C1 (FIG. 2 C1) having a frequency of, for example, 2/5 fsc is supplied to a terminal 2. By fsc is meant the frequency (3.58 MHz) of a color subcarrier wave generated within a TV receiver. The terminal 1 is connected through an inverter 11a to the CP terminal (clock pulse terminal) of a JK flip-flop circuit 3, and the reset output, i.e. the $\bar{Q}$ output, of the JK flip-flop circuit is fed back to the J and K terminals of the JK flip-flop circuit. The flip-flop circuit 3 is set at a rise of each pulse included in the composite synchronizing signal to produce a set output i.e. a Q output. The Q output lasts until the output of an AND circuit 4 to be later described is fed back to the reset terminal of the flip-flop circuit 3. The Q output is supplied as one input to an AND circuit 5 and the clock pulse C1 is supplied as the other input to the AND circuit 5. A first counting circuit 6 consists of first, second and third flip-flop circuits 6a, 6b and 6c connected in series configuration. The output of the AND circuit 5 is supplied to the CP terminal of the first flip-flop circuit 6a. The Q outputs of the second and third flip-flop circuits 6b and 6c are supplied to the AND circuit 4. The flip-flop circuit 3 and first counting circuit are reset by the output of the AND circuit 4. The flip-flop circuit 3 is a circuit for generating a to-be-later described reference pulse in response to each pulse included in the composite synchronizing signal A and an AND circuit 7 is adapted to generate a first pulse D in synchronism with the reference pulse and is supplied with the Q outputs of the first and third flip-flop circuits 6a and 6c and the Q output of the second flip-flop circuit 6b.

The output, i.e. the first pulse D, of the AND circuit 7 is fed to the CP terminal of a JK flip-flop circuit 8 in the circuit Y1. The JK flip-flop circuit 8 is set at the rise of the first pulse D to produce a Q output and adapted to generate a $\bar{Q}$ output when the output of an AND circuit 9 to be later described is delivered to the reset terminal R of the flip-flop circuit 8. The $\bar{Q}$ output of the flip-flop circuit 8 is fed back to the J and K terminals of the flip-flop circuit 8. A second counting circuit 10 consists of first, second, third and fourth flip-flop circuits 10a, 10b, 10c and 10d which are connected in series configuration. The Q output of the flip-flop circuit 8 and a second clock pulse C2 having a frequency of 2/35 fsc are delivered to an AND circuit 13, the output of which is supplied to the CP terminal of the first flip-flop circuit 10a. The output of the AND circuit 13 is delivered through an inverter 11b to one input of the AND circuit 9 and the Q outputs of the third and fourth flip-flop circuits 10c and 10d are delivered to the other inputs of the AND circuit 9. The flip-flop circuit 8 and counting circuit 10 are set by the output of the AND circuit 9. An AND circuit 14 is supplied with the first pulse D from the AND circuit 7 and the $\bar{Q}$ output of the flip-flop circuit 8. The output G of the AND circuit 14 represents a horizontal synchronzing pulse.

Let us now explain the operation of the circuit arrangement shown in FIG. 1 by reference to FIGS. 2 and 3.

As shown in FIG. 2, a horizontal synchronizing pulse A1, equalizing pulse A2 and vertical synchronizing pulse A3 are included in the composite synchronizing signal A. Noise pulses, not shown, are frequently included in the composite synchronizing signal. This embodiment is designed to obtain a horizontal synchronizing signal consisting of the horizontal synchronizing pulse A1 without being influenced by the noise pulses. The horizontal synchronizing pulse A1 as shown enlarged in FIG. 2 A1 has a width of 4.9 ms. Seven first clock pulses C1 can be included in the pulse width of the horizontal synchronizing pulse A1(FIG. 2 C1). When the pulses A1, A2 and A2 and A3 are supplied together with the noise pulse, Q output is produced. While the Q output is 1, a first clock pulse C1 is supplied from the AND circuit 5 to the first flip-flop circuit 6a. When the first counting circuit 6 counts six first clock pulses C1, the AND circuit 4 is opened and the first counting circuit 6 and flip-flop circuit 3 are reset by the output of the AND circuit 4. Since the AND circuit 4 is connected as mentioned above, the reset output is generated when the six first clock pulses C1 are counted. At the same time, the sixth first clock pulse is derived as an output from the AND circuit 7 (FIG. 2 D).

The Q output of the flip-flop circuit 3 has always a predetermined width irrespective of the input pulse (including a noise pulse) width. According to this invention, therefore, the Q output is referred to as a reference pulse. From FIGS. 2 A1, C1 and D it will be understood that the output of the AND circuit 7, i.e. the first pulse, is in synchronism with the horizontal synchronizing pulse.

When the first pulse D is delivered to the flip-flop circuit 8, the Q output of the flip-flop circuit lasts from the rise of the first pulse until the flip-flop circuit 8 is reset. Therefore, the second counting circuit 10 can count during the Q output lasting period second clock pulses C2 (2/35 fsc) passed through the AND circuit 13. Since the cycle of the horizontal synchronizing pulse A1 is 63.5 $\mu$s, 13 second clock pulses C2 can occur during this time period. In FIG. 3–10Q1 to 10Q4 there are shown the output waveforms of Q outputs from the flip-flop circuits 10a–10d in the second counting circuit 10 which occur from a rise of the Q output until 13 second clock pulses are counted. When the thirteenth second clock pulse is counted, the AND circuit is ANDed to cause the flip-flop circuits of the counting circuit 10 and flip-flop circuit 8 to be reset. The Q output appearing at this time from the flip-flop circuit 8 is shown in FIG. 3–8$\bar{Q}$. The width of the Q output corresponds to one cycle of the second clock pulse. Suppose that a first-clock pulse appears from the AND circuit 7 in response to the horizontal synchronizing pulse. Then, a second horizontal synchronizing pulse occurs during a pulse width period shown in FIG. 3–8$\bar{Q}$ and is passed through AND circuit 14 and a horizontal synchronizing pulse shown in FIG. 3 G is obtained. In contrast, if a first first-clock pulse is obtained in response to an equalizing pulse or a vertical synchronizing pulse, the equalizing pulse or vertical synchronizing pulse differs in cycle from the horizontal synchronizing pulse and, therefore, no pulse shown in FIG. 3 G is obtained. If the first first-clock pulse is obtained in response to a noise pulse, no pulse shown in FIG. 3 G is obtained, since such noise pulse has no periodicity. It is therefore possible to extract only the horizontal synchronizing pulse or horizontal synchronizing signal.

Let us now explain, by reference to FIG. 4, why the first pulse D having a predetermined time relation to the rise of any pulse supplied to the CP terminal of the flip-flop circuit 3 is obtained from the AND circuit 7. In FIG. 4 a Q output, i.e. reference pulse RP, from the flip-flop circuit 3 rises when an equalizing pulse A2-15 rises, and falls when six first clock pulses had been counted. The waveforms of Q outputs from the flip-flop circuits 6a, 6b and 6c which occur during the counting of said six first clock pulses are shown in FIG. 4–6Q1 to 6Q3. When said six first clock pulses had been counted, a reset pulse 4E appears from the AND circuit 4 and the flip-flop circuit 3 is reset. When said six first clock pulses had been counted, the AND circuit 7 is ANDed to generate a first pulse D. Consequently, it is possible to extract any necessary horizontal synchronizing signal even during a time period including the equalizing pulse and vertical pulse. If any one of horizontal synchronizing pulses to be included in the composite synchronizing signal A is lacking, then it is impossible to extract a horizontal synchronizing pulse G in a time position corresponding to that in which the horizontal synchronizing pulse is lacking.

With the embodiment of FIG. 1 the first pulse D is generated in response to any pulse included in the composite synchronizing signal. With an embodiment of FIG. 5, however, a first pulse D is generated only when any pulse having a width equal to, or greater than, the width of the horizontal synchronizing pulse is detected. A separate gate circuit is opened during the portion of a relatively wide time width including a point of time delayed a predetermined time period — a period corresponding to one cycle of the horizontal synchronizing pulse — from the rise of the detected pulse, and only the first pulse passed first through the separate gate circuit is extracted as a horizontal synchronizing signal.

In FIG. 5 a third counting circuit 21 consists of flip-flop circuits 21a, 21b and 21c connected in series configuration. A composite synchronizing signal A is supplied through an inverter 22 to the reset terminal R of the respective flip-flop circuits. The composite synchronizing signal A and first clock pulse C1 (2/5 fsc) are delivered to an AND circuit 23, and the output of the AND circuit 23 is supplied to the CP terminal of the flip-flop circuit 21a. The output of the AND circuit is supplied, together with the Q outputs of the flip-flop circuits 21a to 21c and $\bar{Q}$ output of the flip-flop circuit 21b, to an AND circuit 24. Consequently, the counting circuit 21 initiates counting of the first clock pulse C1 at the time of the rise of an incoming pulse and is reset at the time of the fall of the incoming pulse. A 4.9 μs horizontal synchronizing pulse can include seven 2/5 fsc clock pulses as explained in connection with FIG. 2. When, therefore, a horizontal synchronizing pulse arrives and six first clock pulses are counted, the AND circuit 24 is ANDed and the sixth clock pulse is derived as a first pulse Da. The same thing holds true when a vertical pulse arrives. However, when an equalizing pulse comes, the counting circuit is reset due to the narrow width of the equalizing pulse before it counts six first clock pulses. As a result, no first pulse Da appears. The above-mentioned circuit is referred to as X2.

A circuit indicated by Y2 comprises a flip-flop circuit 25, AND circuit 28, fourth counting circuit 26 and AND circuit 27. The counting circuit 26 consists of first, second, third, fourth and fifth flip-flop circuits 26a, 26b 26c, 26d and 26e connected in series configuration. The first pulse Da is supplied to the reset terminal R of the flip-flop circuit 25 and a second clock pulse C2 (2/35 fsc) is supplied to the CP terminal of the flip-flop circuit 25. The $\bar{Q}$ output of the flip-flop circuit 25 is fed back to the J and K terminals of the flip-flop circuit 25. The AND circuit 28 is supplied with the $\bar{Q}$ output of the flip-flop circuit 25 and the second clock pulse C2. The output of the AND circuit 28 is supplied to the reset terminal of the respective flip-flop circuits 26a to 26e. The $\bar{Q}$ output of the flip-flop circuit 26e is fed back to the J and K terminals of the flip-flop circuit 26a to which the second clock pulse is supplied. The AND circuit 27 is supplied with the first pulse Da and the Q outputs of the flip-flop circuits 26c and 26d to generate a horizontal synchronizing pulse Ga.

Even if any pulse (including a noise pulse) having smaller width than the horizontal synchronizing pulse width (4.9 μs) arrives at the circuit X2, no first pulse Da appears as set out above. Since the flip-flop circuit 25 is reset at the time of the rise of the first pulse Da, the flip-flop circuit 25 delivers only one second clock pulse as a Q and is immediately reset. For this reason, the one second clock pulse C2 is delivered from the AND circuit 28 to the counting circuit 24 and the counting circuit initiates counting of the second clock pulse C2.

FIG. 6 shows the waveforms of each part of the circuit Y2 when it is in an operative condition. Suppose that a first pulse 30 in synchronism with a horizontal pulse detected at the circuit X2 is obtained from the AND circuit 24. Then, a $\bar{Q}$ output 31 (FIG. 6–25$\bar{Q}$) is obtained from the flip-flop circuit 25 and a pulse 32 (FIG. 6–28E) is obtained from the AND circuit 28. This causes the counting circuit 26 to initiate counting of a second clock pulse (FIG. 6–C2). When the counting circuit 26 counts 13 second clock pulses, a first pulse 30a (FIG. 6–Da), $\bar{Q}$ output 31a (FIG. 6–25$\bar{Q}$) and output 32a of the AND circuit 28 (FIG. 6–28E) are generated, since the cycle of the horizontal synchronizing pulse is 63.5 μs. The output waveforms of the flip-flop circuits 26a, 26b, 26c and 26d are indicated by 26Q1, 26Q2, 26Q3 and 26Q4, respectively. Since the Q output of the flip-flop circuits 26c and 26d is 1 at a point of time when the counting circuit 26 counts 12 second clock pulses C2, a gate pulse (FIG. 6–27E) for the AND circuit 27 is generated. In the absence of the first pulse 30a the gate pulse 33 lasts until 16 second clock pulses are counted. The output, i.e. a first pulse Ga, of the AND circuit 27 is passed through AND circuit 27 and derived as a horizontal synchronizing pulse 34a (FIG. 6 Ga). At the same time, the counting circuit 26 is reset and initiates counting of the second clock pulses ready for the next horizontal synchronizing pulse 34b.

Even when a noise pulse having a width greater than that of the horizontal synchronizing pulse comes during the time period in which the counting circuit 26 counts 12 second clock pulses, no gate pulse 33 is generated and, consequently, no first pulse Da is derived as a horizontal synchronizing pulse. Even if a first pulse Da is generated subsequently to the appearance of the pulse 30a during the time period in which 12 to 16 second clock pulses are counted, a gate pulse 33 is terminated in response to the pulse 30a and the first pulse Da is not derived as a horizontal synchronizing pulse. It will be understood that, since a noise pulse does not come at the same cycle as a horizontal synchronizing pulse, only the horizontal synchronizing pulse can be extracted.

The above-mentioned embodiments are both directed to the extraction of only a horizontal synchronizing pulse from a composite synchronizing signal which is separated from a video signal. However, only a vertical synchronizing pulse can be extracted by suitably modifying the circuits shown in FIGS. 1 and 5.

This invention is not restricted to the extraction of a synchronizing signal from a composite synchronizing pulse which is separated from a video signal. It can also be applied to the extraction, from any composite synchronizing signal including a plurality of synchronizing signals, of a synchronizing signal whose constituent synchronizing pulses have desired cycles.

What is claimed is:

1. A synchronizing signal extracting device for extracting, from a composite synchronizing signal including a plurality of synchronizing signals whose respective constituent synchronizing pulses are different in cycle and width from each other, a synchronizing signal whose constituent synchronizing pulses have a desired cycle, said synchronizing signal extracting device comprising means including a circuit for generating, in response to each of pulses included in said composite synchronizing signal, a reference pulse of predetermined width the leading edge of which is in synchronism with the leading edge of the pulse of said composite synchronizing signal, said means being operative to generate a first pulse in synchronism with the reference pulse, and a synchronizing pulse extracting means including a gate circuit to which the first pulse is supplied as an input and being operative to open the gate circuit during a time period corresponding to a time width including a point of time delayed a predetermined period from the rise of the reference pulse and to extract, as a synchronizing pulse constituting a synchronizing signal to be extracted, the first pulse passed through the gate circuit during said time period.

2. A synchronizing signal extracting device according to claim 1 in which said composite synchronizing signal is separated from a video signal and includes a vertical synchronizing pulse, horizontal synchronizing pulse and equalizing pulse.

3. A synchronizing signal extracting device for extracting, from a composite synchronizing signal including a plurality of synchronizing signals whose respective constituent synchronizing pulses are different in cycle and width from each other, a synchronizing signal whose constituent synchronizing pulses have a desired cycle, said synchronizing signal extracting device comprising means including a circuit for generating, in response to each of pulses included in said composite synchronizing signal, a reference pulse of predetermined width the leading edge of which is in synchronism with the leading edge of the pulse of said composite synchronizing signal, said means being operative to generate a first pulse in synchronism with the reference pulse, and a synchronizing pulse extracting means including a gate circuit to which the first pulse is supplied as an input and being operative to open the gate circuit during a time period corresponding to a time width including a point of time delayed a predetermined period from the rise of the reference pulse and to extract, as a synchronizing pulse constituting a synchronizing signal to be extracted, the first pulse passed through the gate circuit during said time period; said first pulse generating means comprising a first flip-flop circuit for generating a set output pulse which rises at the time of the rise of each pulse included in the composite synchronizing signal and lasts until it is reset; a first AND circuit for receiving the set output pulse and first clock pulse and for generating the output of the first clock pulse during a time period in which the set output lasts; a first counting circuit for receiving the output of the first AND circuit and for counting the first clock pulse; a second AND circuit connected to the first counting circuit and operative to generate an output, when the first counting circuit counts a predetermined number of first clock pulses, to thereby reset said first flip-flop circuit and said first counting circuit; and a third AND circuit connected to the first counting circuit and operative to generate said first pulse when the first counting circuit counts a predetermined number of first clock pulses.

4. A synchronizing signal extracting device according to claim 3 in which the frequency of said first clock pulse is two fifths of the frequency of a color sub-carrier generated in a color television receiver; said first counting circuit consists of first, second and third counting flip-flop circuits connected in series configuration; and the inputs of said third AND circuit are the output of said first AND circuit, set output of the first counting flip-flop circuit, reset output of the second counting flip-flop circuit, and set output of the third flip-flop circuit.

5. A synchronizing signal extracting device for extracting, from a composite synchronizing signal including a plurality of synchronizing signals whose respective constituent synchronizing pulses are different in cycle and width from each other, a synchronizing signal whose constituent synchronizing pulses have a desired cycle, said synchronizing signal extracting device comprising means including a circuit for generating, in response to each of pulses included in said composite synchronizing signal, a reference pulse of predetermined width the leading edge of which is in synchronism with the leading edge of the pulse of said composite synchronizing signal, said means being operative to generate a first pulse n synchronism with the reference pulse, and a synchronizing pulse extracting means including a gate circuit to which the first pulse is supplied as an input and being operative to open the gate circuit during a time period corresponding to a time width including a point of time delayed a predetermined period from the rise of the reference pulse and to extract, as a synchronizing pulse constituting a synchronizing signal to be extracted, the first pulse passed through the gate circuit during said time period; said synchronizing pulse extracting means comprising a second flip-flop circuit for generating a set output pulse which rises, when the first pulse is supplied, and lasts until it is reset; a fourth AND circuit for receiving the second clock pulse and the set output pulse from the second flip-flop circuit and for generating an output of second clock pulse during a time period in which the set output pulse of the second flip-flop circuit lasts; a second counting circuit for counting the second clock pulse from the fourth AND circuit; a fifth AND circuit connected to the second counting circuit and operative to generate an output when the second counting circuit counts a predetermined number of second clock pulses, to thereby reset the second flip-flop circuit and second counting circuit; and a sixth AND circuit adapted to receive, as inputs, the reset output pulse from the second flip-flop circuit and the first pulse and to extract from the first pulse a synchronizing pulse constituting a desired synchronizing signal.

6. A synchronizing signal extracting device according to claim 5 in which the frequency of said second clock pulse is two thirtyfifths of the frequency of a color sub-carrier generated in a color television receiver; said second counting circuit consists of first, second, third and fourth counting flip-flop circuits; and the inputs of said fifth AND circuit are the inverted output of said fourth AND circuit and set outputs of said third and fourth counting flip-flop circuits.

7. A synchronizing signal extracting device for extracting, from a composite synchronizing signal including a plurality of synchronizing signals whose respective constituent synchronizing pulses are different in cycle and width from each other, a synchronizing signal whose constituent synchronizing pulse has a desired cycle, said synchronizing signal extracting device comprising means operative to detect a pulse having a width equal to, or greater than, the width of synchronizing pulses constituting a to-beextracted synchronizing signal included in the composite synchronizing signal and generate a first pulse in synchronism with the detected pulse; and synchronizing pulse extracting means including a gate circuit to which the first pulse is supplied, and operative to open the gate circuit during a time period corresponding to a predetermined time width including a point of time delayed a predetermined time period from the rise of the detected pulse and extract, as the synchronizing pulse constituting the to-be-extracted synchronizing signal, the first pulse passed first through the gate circuit during this time period.

8. A synchronizing signal extracting device according to claim 7 in which said composite synchronizing signal is separated from a video signal and includes a vertical synchronizing pulse, horizontal synchronizing pulse and equalizing pulse.

9. A synchronizing signal extracting device according to claim 7 in which said first pulse generating means comprises a first AND circuit for receiving the composite synchronizing signal and first clock pulse and generating output clock pulse during a time period corresponding to each width of the pulses included in the composite synchronizing signal; and a first counting circuit operative to count the output clock pulse of the first AND circuit from the time of the rise of a pulse included in the composite synchronizing signal and be reset when the pulse falls; and a second AND circuit connected to said first counting circuit and operative to generate the first pulse when said first counting counts a predetermined number of the first clock pulses.

10. A synchronizing signal extracting device according to claim 7 in which said synchronizing pulse extracting means comprises a JK flip-flop circuit having a reset terminal to which the first pulse is supplied and a clock pulse terminal to which a second clock pulse is supplied, and operative to be reset by the first pulse; a third AND circuit for receiving the second clock pulse and reset output of the JK flip-flop circuit as inputs and generating a reset output; a second counting circuit for initiating counting of the second clock pulse supplied to its input terminal, when it is reset by the output of the third AND circuit; and a fourth AND circuit adapted to receive the first pulse and outputs of predetermined stages of the second counting circuit and pass, as a desired synchronizing signal, the first pulse arriving first during the time period in which the second counting circuit counts a predetermined number of second clock pulses.

11. A synchronizing signal extracting device according to claim 9 in which the frequency of said first clock pulse is two fifths of the frequency of a color sub-carrier generated in a color television receiver; said first counting circuit consists of first, second and third counting flip-flop circuits connected in series configuration; and the inputs of said second AND circuit are the output of the first AND circuit, set outputs of the first and third counting flip-flop circuits and reset output of the second counting flip-flop circuit.

12. A synchronizing signal extracting device according to claim 10 in which the frequency of said second clock pulse is two thirtyfifths of the frequency of a color sub-carrier generated in a color television receiver; said second counting circuit consists of first, second, third, fourth and fifth counting flip-flop circuits connected in series configuration; and the inputs of said fourth AND circuit are the first pulse and the set outputs of the third and fourth counting flip-flop circuits.

* * * * *